I. E. CHRISTOPHER.
COMBINED GYROSCOPE AND ELEVATING WHEEL FOR AIRSHIPS.
APPLICATION FILED JAN. 12, 1915.
1,185,480.   Patented May 30, 1916.
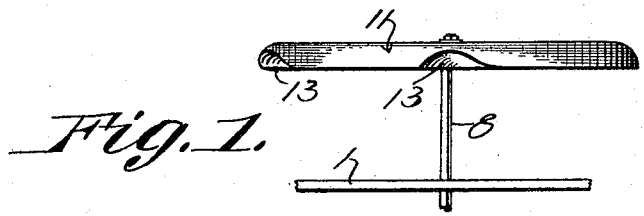
Fig. 1.
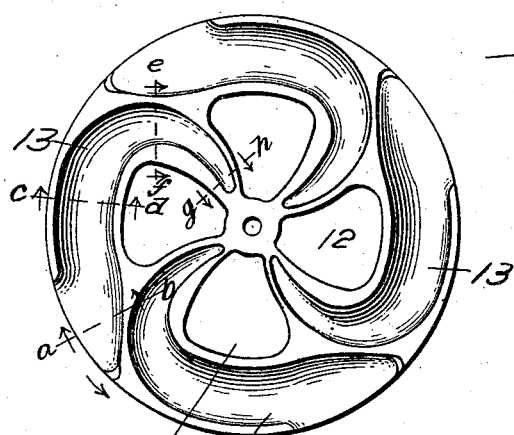
Fig. 2.
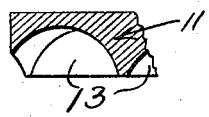
Fig. 3.
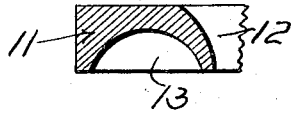
Fig. 4.
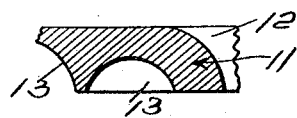
Fig. 5.
Fig. 6.
I. E. Christopher,
Inventor
Witnesses
by C. A. Snow & Co.
Attorneys

UNITED STATES PATENT OFFICE.

IRVIN E. CHRISTOPHER, OF ALLIANCE, OHIO.

COMBINED GYROSCOPE AND ELEVATING-WHEEL FOR AIRSHIPS.

1,185,480. Specification of Letters Patent. Patented May 30, 1916.

Application filed January 12, 1915. Serial No. 1,839.

*To all whom it may concern:*

Be it known that I, IRVIN E. CHRISTOPHER, a citizen of the United States, residing at Alliance, in the county of Stark and State of Ohio, have invented a new and useful Combined Gyroscope and Elevating-Wheel for Airships, of which the following is a specification.

This invention relates to a combined gyroscope and elevating wheel for airships, one of the objects of the invention being to provide a device of this type whereby the airship may be steadied while in flight, whereby a more rapid and direct ascent may be attained, and whereby the sudden descent of the machine is prevented.

A further object is to provide a combined gyroscope and helicopter which is of novel form so as to exert a rapid and effective downward displacement of air during the operation of the helicopter.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the combined gyroscope and elevating wheel. Fig. 2 is a bottom plan view thereof. Fig. 3 is a section on line *a—b* Fig. 2. Fig. 4 is a section on line *c—d* Fig 2. Fig. 5 is a section on line *e—f* Fig. 2. Fig. 6 is a section on line *g—h* Fig. 2.

Referring to the figures by characters of reference 1 designates a portion of an airship structure having an upwardly extending shaft 8 which may be rotated in any suitable manner. The combined helicopter and gyroscope is connected to the upper end of shaft 8 and is in the form of a wheel 11 provided adjacent its center with openings 12 spaced apart at regular intervals and which openings gradually increase in width toward their outer ends. Formed within the lower face of the wheel 11 are grooves 13 extending from the periphery of the wheel inwardly to a point adjacent the center thereof, each groove having its outer end portion disposed substantially concentric with the periphery of the wheel so as thus to extend between said periphery and one of the openings 12, the inner end portion of the channel being curved inwardly between two of the openings. Furthermore each groove or channel gradually diminishes in depth from its outer to its inner end, as will be seen by referring to Figs. 3 to 6 inclusive, the inner end portion of each channel discharging into the adjacent opening 12. Thus it will be seen that the walls of each groove constitute an inclined plane whereby, during the rapid rotation of the wheel 11, air is displaced downwardly, the openings 12 permitting air to circulate downwardly through the wheel during the ascent of the machine. Furthermore by reason of the peculiar contour of each groove 13, the efficiency of the wheel as a means for displacing air downwardly is greatly increased because of the long inclined planes provided by the walls of the respective grooves. By reason of the weight of the wheel, the same will act as a gyroscope to steady the machine while in flight.

It is to be understood that by causing the wheel 11 to rotate rapidly in the direction of the arrows, the machine to which the wheel is attached will ascend more rapidly than would be possible where a soaring action is required solely. This rapid ascent is caused by the downward displacement of the air by the wheel 11 during the rotation of the wheel. After the machine has attained the desired altitude the wheel can continue to rotate at a reduced speed so as thus to act as a gyroscope and steady the machine while in flight. Should the machine descend while the engine is out of control, the wheel 11 will act as a resisting medium and will be rotated in a direction opposite to that indicated by arrows in the drawings, by the rush of air past the wheel, and this rotation can be retarded by applying a brake to the motor of the machine so that too rapid descent of the machine will be prevented.

Importance is attached to the fact that the grooves 13 in the lower face of the wheel 11 have their outer end portions extended substantially in the direction of rotation of the wheel so that the air is thus better acted on and more readily enters the grooves than would otherwise be possible.

What is claimed is:—

1. A wheel mounted for rotation in a substantially horizontal plane and constituting a combined helicopter and gyroscope, said wheel having spaced openings extending therethrough adjacent its center, and grooves of gradually diminishing depth within the lower face of the wheel and extending from the periphery toward the center thereof, the outer portions of the grooves being disposed substantially concentric with the wheel and the inner end portions being curved inwardly between the openings.

2. A wheel mounted for rotation in a substantially horizontal plane and constituting a combined helicopter and gyroscope, said wheel having spaced openings extending therethrough adjacent its center, and grooves of gradually diminishing depth within the lower face of the wheel and extending from the periphery toward the center thereof, the outer portions of the grooves being disposed substantially concentric with the wheel and the inner end portions being curved inwardly between the openings, the outer end portions of the grooves being extended in the direction of rotation of the wheel.

3. A combined gyroscope and elevating wheel for airships having spaced openings extending therethrough adjacent its center, grooves of gradually diminishing depth within the lower face of the wheel and extending from the periphery toward the center thereof, the outer portions of the grooves being disposed substantially concentric with the wheel and the inner end portions being curved inwardly between the openings, the outer end portions of the grooves being extended in the direction of rotation of the wheel.

In testimony that I claim the foregoing as my own, I have hereto affixed my signature in the presence of two witnesses.

IRVIN E. CHRISTOPHER.

Witnesses:
ELMER E. COOPER,
WILLIAM E. SHEM.